(12) United States Patent
Song et al.

(10) Patent No.: US 12,445,906 B2
(45) Date of Patent: Oct. 14, 2025

(54) APPARATUS AND METHOD FOR E2 INTERFACE CONFIGURATION INCLUDING CELL INFORMATION IN WIRELESS ACCESS NETWORK

(71) Applicant: Samsung Electronics Co., Ltd., Suwon-si (KR)

(72) Inventors: Junhyuk Song, Suwon-si (KR); Jeongyeob Oak, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/835,248

(22) Filed: Jun. 8, 2022

(65) Prior Publication Data

US 2022/0303831 A1 Sep. 22, 2022

Related U.S. Application Data

(63) Continuation of application No. PCT/KR2020/018111, filed on Dec. 10, 2020.
(Continued)

(30) Foreign Application Priority Data

Dec. 12, 2019 (KR) .......................... 10-2019-0165946

(51) Int. Cl.
*H04L 45/247* (2022.01)
*H04L 5/00* (2006.01)
(Continued)

(52) U.S. Cl.
CPC ........... *H04W 28/18* (2013.01); *H04L 5/0073* (2013.01); *H04W 28/082* (2023.05)

(58) Field of Classification Search
None
See application file for complete search history.

(56) References Cited

U.S. PATENT DOCUMENTS

| 10,805,168 B2 | 10/2020 | Xu et al. |
| 2015/0156641 A1 | 6/2015 | Henderson et al. |
| (Continued) | | |

FOREIGN PATENT DOCUMENTS

| CN | 101047544 A | 10/2007 |
| CN | 108702810 A | 10/2018 |
| (Continued) | | |

OTHER PUBLICATIONS

Anonymous: "ORAN WG2 AI-MLUse case CR traffic steering", Oran Alliances, Oct. 7, 2019, pp. 1-8, XP055905638.
(Continued)

*Primary Examiner* — Willie J Daniel, Jr.
(74) *Attorney, Agent, or Firm* — Jefferson IP Law, LLP

(57) ABSTRACT

A method performed by an E2 node is provided. The method includes transmitting a first message to a radio access network (RAN) intelligent controller (RIC) through an E2 interface to the RIC, and receiving a second message from the RIC in response to the first message, wherein the first message is an E2 setup request message or a configuration update message, and wherein the first message comprises at least one of first configuration information of one or more serviced new radio (NR) cells or second configuration information of one or more serviced evolved universal mobile telecommunications system (UMTS) terrestrial radio access (E-UTRA) cells.

20 Claims, 10 Drawing Sheets

Related U.S. Application Data

(60) Provisional application No. 62/946,081, filed on Dec. 10, 2019.

(51) Int. Cl.
    *H04W 28/082*     (2023.01)
    *H04W 28/18*     (2009.01)

(56) References Cited

U.S. PATENT DOCUMENTS

| | | |
|---|---|---|
| 2018/0368109 A1 | 12/2018 | Kim |
| 2019/0158360 A1 | 5/2019 | Xu et al. |
| 2019/0281116 A1 | 9/2019 | Yang et al. |
| 2022/0225066 A1* | 7/2022 | Song .................. H04W 4/60 |

FOREIGN PATENT DOCUMENTS

| | | |
|---|---|---|
| EP | 4 044 702 A1 | 8/2022 |
| WO | 2019/183020 A1 | 9/2019 |

OTHER PUBLICATIONS

Yannan Yuan, "Near-RT Radio Intelligent Controller: Unleash potential of customized RAN", Openairinterface Workshop, Fall 2019, Dec. 3, 2019, pp. 1-10, XP009534549.

Extended European Search Report dated Dec. 23, 2022, issued in European Patent Application No. 20897684.5.

Rittwik Jana et al., 'ORAN SC Release A requirements', O-RAN Tokyo Workgroup Face-to-Face Meeting Information, URL: htttpps://wiki.o-ran-sc.org/display/EV/Presentations, Jun. 19, 2019.

AT&T, 'ORAN WG2 AI-MLUse case CR traffic steering', ORAN WG2 AIML workflow description and requirements TR v01.00, Oct. 7, 2019.

Chinese Office Action dated Jul. 8, 2024, issued in Chinese Patent Application No. 202080092669.1.

Nokia; 5G RAN optimization using the O-RAN software community's RIC (RAN Intelligent Controller); ONS Europe, Sep. 23, 2019.

Jana et al.; O-RAN SC Release A requirements; Jun. 18, 2019.

Abeta et al., O-RAN Alliance Standardization Trends; Radio Access Network Development Department; Special Articles on Standardization Trends toward Open and Intelligent Radio Access Networks; NTT DOCOMO Technical Journal vol. 21, No. 1; Jul. 2019.

Schulz et al., Network Architectures for Demanding 5G Performance Requirements; Tailored Toward Specific Needs of Efficiency and Flexibility; IEEE vehicular technology magazine; Jun. 2019.

European Office Action dated Oct. 11, 2024, issued in European Patent Application No. 20897684.5.

Chinese Office Action dated Dec. 10, 2024, issued in Chinese Patent Application No. 202080092669.1.

Indian Office Action dated Feb. 11, 2025, issued in an Indian Patent Application No. 202217039359.

Korean Office Action dated Aug. 21, 2025, issued in Korean Patent Application No. 10-2019-0165946.

\* cited by examiner

APPARATUS AND METHOD FOR E2 INTERFACE CONFIGURATION INCLUDING CELL INFORMATION IN WIRELESS ACCESS NETWORK

CROSS-REFERENCE TO RELATED APPLICATION(S)

This application is a continuation application, claiming priority under § 365(c), of an International application No. PCT/KR2020/018111, filed on Dec. 10, 2020, which is based on and claims the benefit of a U.S. Provisional application Ser. No. 62/946,081, filed on Dec. 10, 2019, in the U.S. Patent and Trademark Office, and of a Korean patent application number 10-2019-0165946, filed on Dec. 12, 2019, in the Korean Intellectual Property Office, the disclosure of each of which is incorporated by reference herein in its entirety.

BACKGROUND

1. Field

The disclosure relates to a radio access network. More particularly, the disclosure relates to an apparatus and a method for E2 interface configuration including cell information in the radio access network included in a wireless communication system.

2. Description of Related Art

To satisfy a wireless data traffic demand which is growing after a 4th generation (4G) communication system is commercialized, efforts are exerted to develop an advanced $5^{th}$ generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 gigahertz (GHz) band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

The 5G system and new radio or next radio (NR) are commercialized to satisfy demand for wireless data traffic, and provide a high data rate service to a user through the 5G system with 4G, and it is also expected that wireless communication services for various purposes such as internet of things and a service requiring high reliability for a specific purpose may be provided. Open radio access network (O-RAN) established by operators and equipment providers in a system where the current 4G communication system and the 5G system are mixed defines a new network element (NE) and an interface standard based on the existing 3rd generation partnership project (3GPP) standard, and suggests an O-RAN structure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for supporting an operator-specific service in a radio access network (RAN).

Another aspect of the disclosure is to provide an apparatus and a method for generating and interpreting a message related to a service model (SM) in a RAN.

Additional aspects will be set forth in part in the description which follows and, in part, will be apparent from the description, or may be learned by practice of the presented embodiments.

In accordance with an aspect of the disclosure, an operating method of an apparatus using an interface between nodes constructing a radio access network intelligent controller (RIC) and a base station in a radio access network is provided. The operating method includes generating a message including at least one serving cell or at least one neighboring cell information provided by the node, and transmitting the message to the RIC.

In accordance with another aspect of the disclosure, a method performed by an E2 node is provided. The method includes transmitting a first message to a RIC through an E2 interface to the RIC, and receiving a second message from the RIC in response to the first message, the first message may be an E2 setup request message or a configuration update message, and the first message may include at least one of first configuration information of one or more serviced new radio (NR) cells or second configuration information of one or more serviced evolved universal mobile telecommunications system (UMTS) terrestrial radio access (E-UTRA) cells.

In accordance with another aspect of the disclosure, a method performed by a RIC is provided. The method includes transmitting a first message from an E2 node to the RIC through an E2 interface, and in response to the first message, transmitting a second message to the E2 node, the first message may be an E2 setup request message or a configuration update message, and the first message may include at least one of first configuration information of one or more serviced NR cells or second configuration information of one or more serviced E-UTRA cells.

In accordance with another aspect of the disclosure, an apparatus performed by an E2 node is provided. The apparatus includes at least one transceiver, and at least one processor, the at least one processor may be configured to transmit a first message to a RIC through an E2 interface to the RIC, and receive a second message from the RIC in response to the first message, the first message may be an E2 setup request message or a configuration update message, and the first message may include at least one of first configuration information of one or more serviced NR cells or second configuration information of one or more serviced E-UTRA cells.

In accordance with another aspect of the disclosure, an apparatus performed by a RIC is provided. The apparatus includes at least one transceiver, and at least one processor, the at least one processor may be configured to transmit a first message from an E2 node to the RIC through an E2 interface, and in response to the first message, transmit a second message to the E2 node, the first message may be an E2 setup request message or a configuration update message, and the first message may include at least one of first configuration information of one or more serviced NR cells or second configuration information of one or more serviced E-UTRA cells.

An apparatus and a method according to various embodiments of the disclosure may support a radio access network intelligent controller (RIC) service model defined operator-specifically.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
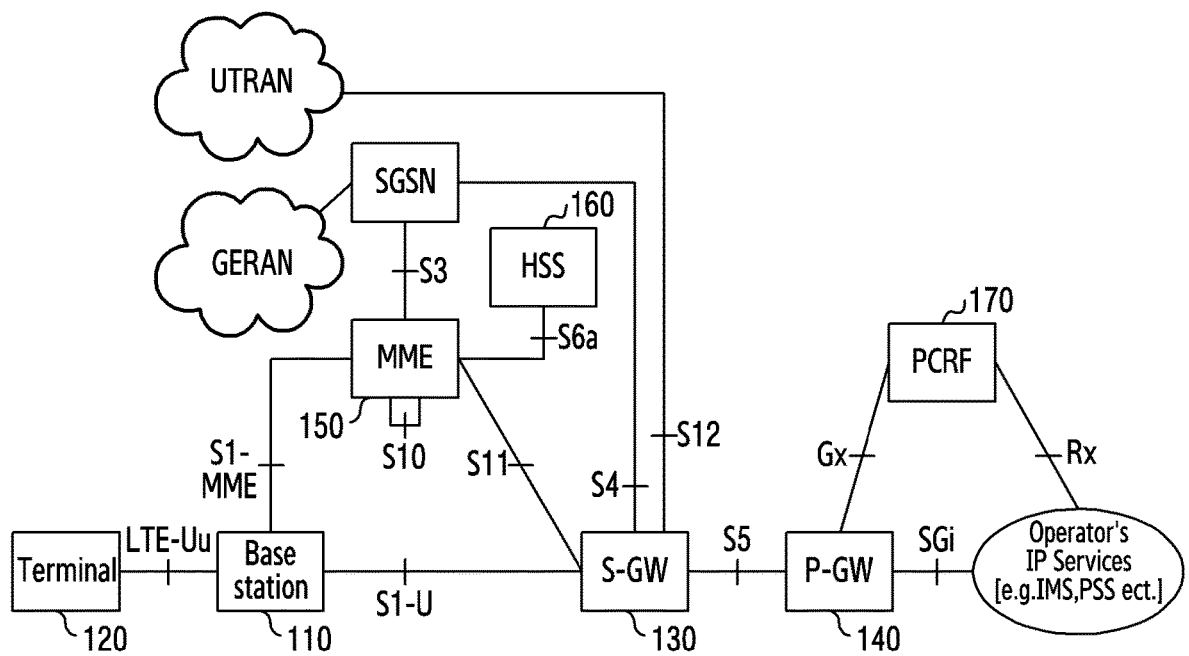
FIG. 1 illustrates an example of a 4th generation (4G) long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A hardware-based approach will be described as an example in various embodiments of the disclosure to be described hereafter. However, various embodiments of the disclosure include technology which uses both hardware and software, and accordingly various embodiments of the disclosure do not exclude a software-based approach.

Hereafter, the preset disclosure relates to operations such as E2 interface setup, subscription, indication, control and so on between a device in a radio access network (hereafter, 'RAN') of a wireless communication system and a device for controlling the RAN. In particular, the disclosure explains a technique for delivering serving cell/neighbor cell information in the E2 interface setup to a base station in conformity with an open RAN (O-RAN) standard using an E2 message of the wireless communication system.

Terms for signals, terms indicating channels, terms indicating control information, terms indicating network entities, and terms indicating components of a device used in the following explanation are illustrated for convenience of description. Accordingly, the disclosure is not limited to the terms to be described, and other terms having the same technical meaning may be used.

In addition, the disclosure describes various embodiments using terms used in some communication standard (e.g., 3rd generation partnership project (3GPP)), but this is only an example for description. Various embodiments of the disclosure may be easily modified and applied in other communication systems.

As 4th generation (4G)/5th generation (5G) communication systems (e.g., new radio (NR)) are commercialized, differentiated service support is required for users in a virtualized network. Hence, the O-RAN newly defines a 3GPP network entity (NE) and nodes constructing a base station, a radio unit (RU), a digital unit (DU), a central unit (CU)-control plane (CP), and CU-user plane (UP) as an O-RAN(O)-RU, an O-DU, an O-CU-CP, and an O-CU-UP respectively, and additionally standardizes a near-real-time (NRT) radio access network intelligent controller (RIC). The NRT RIC is a device for standardizing and implementing some call processing function of the existing RAN functions and some of a radio resource management (RRM) function with a central server. The disclosure is to support an operator specific service model in an E2 interface where the RIC requests a service from the O-DU, the O-CU-CP or the O-CU-UP. Herein, the O-RU, the O-DU, the O-CU-CP, and the O-CU-UP may be understood as objects constructing the RAN which may operate according to the O-RAN standard, and may be referred to as E2 nodes. An interface with the objects constructing the RAN which may operate according to the O-RAN standard between the RIC and the E2 nodes uses an E2 application protocol (AP).

The RIC is a logical node for collecting information on a cell site transmitted and received by a terminal and the O-DU, the O-CU-CP or the O-CU-UP. The RIC may be implemented as a server intensively deployed at one physical place. The O-DU and the RIC, the O-CU-CP and the RIC, and the O-CU-UP and the RIC may be connected via Ethernet. For doing so, an interface standard for communications between the O-DU and the RIC, between the O-CU-CP and the RIC, and between the O-CU-UP and the RIC is required, and message formats such as E2-DU, E2-CU-CP, E2-CU-UP and procedure definitions between the O-DU, the O-CU-CP, the O-CU-UP and the RIC are required. In particular, differentiated service support is required for users in a virtualized network, and function definition of messages of E2-DU, E2-CU-CP and E2-CU-UP to support a service for wide cell coverage is required, by concentrating a call processing message/function generating in the O-RAN on the RIC.

Specifically, the RIC may communicate with the O-DU, the O-CU-CP, or the O-CU-UP using the E2 interface, and set an event occurrence condition by generating and transmitting a subscription message. It may transmit through E2 indication/report. Control of the O-DU, the O-CU-CP, and the O-CU-UP is provided using an E2 control message.

FIG. 1 illustrates an example of a 4G long term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME). 150, a home subscriber server (HSS) 160, and a policy and charging rule function (PCRF) 170.

The base station 110 is a network infrastructure for providing radio access to the terminal 120. For example, the base station 110 is a device which performs scheduling by collecting status information such as a buffer state, an available transmit power, and a channel status of the terminal 120. The base station 110 has coverage defined as a specific geographic region based on a signal transmission distance. The base station 110 is connected to the MME 150 through an S1-MME interface. Besides the base station, the base station 110 may be referred to as an 'access point (AP)', an 'eNodeB (eNB)', a 'wireless point', and a 'transmission/reception point (TRP)' or other term having the equivalent technical meaning.

The terminal 120 is a device used by the user, and communicates with the base station 110 over a radio channel. In some cases, the terminal 120 may be operated without user's involvement. That is, at least one of the terminal 120 is a device which performs machine type communication (MTC), and may not be carried by the user. Besides the terminal, the terminal 120 may be referred to as a 'user equipment (UE)', a 'mobile station', a 'subscriber station', a 'remote terminal', a 'wireless terminal', or a 'user device' or other term having the equivalent technical meaning.

The S-GW 130 provides a data bearer, and generates or controls the data bearer under control of the MME 150. For example, the S-GW 130 processes a packet arriving from the base station 110 or a packet to be forwarded to the base station 110. In addition, the S-GW 130 may perform an anchoring role in handover of the terminal 120 between base stations. The P-GW 140 may function as a connection point to an external network (e.g., an internet network). In addition, the P-GW 140 allocates an internet protocol (IP) address to the terminal 120, and serves as an anchor for the S-GW 130. In addition, the P-GW 140 may apply quality of service (QoS) policy of the terminal 120, and manage accounting data.

The MME 150 manages mobility of the terminal 120. In addition, the MME 150 may perform authentication, bearer management, and the like on the terminal 120. That is, the MME 150 is responsible for mobility management and various control functions of the terminal. The MME 150 may interwork with a serving general packet radio service (GPRS) support node (SGSN).

The HSS 160 stores key information and a subscriber profile for the authentication of the terminal 120. The key information and the subscriber profile are transmitted from the HSS 160 to the MME 150 if the terminal 120 accesses the network.

The PCRF 170 defines a policy and a charging rule. The stored information is transmitted from the PCRF 170 to the P-GW 140, and the P-GW 140 may control the terminal 120 (e.g., QoS management, charging, etc.) based on the information provided from the PCRF 170.

Carrier aggregation (hereafter, 'CA') technology is a technology which combines a plurality of component carriers, transmits and receives at one terminal a signal using the plurality of the component carriers at the same time and thus increases frequency use efficiency in terms of the terminal or the base station. Specifically, according to the CA technology, the terminal and the base station may transmit and receive signals using a broadband using the plurality of the component carriers in ab uplink (UL) and a downlink (DL), wherein the component carriers are positioned in different frequency bands respectively. Hereafter, the UL indicates a communication link through which the terminal transmits a signal to the base station, and the DL indicates a communication link through which the base station transmits a signal to the terminal. At this time, the numbers of uplink component carriers and downlink component carriers may be different from each other.

Dual connectivity or multi connectivity is a technology for increasing the frequency use efficiency in terms of the terminal or the base station, in which one terminal is connected to a plurality of different base stations and transmits and receives signals simultaneously using carriers within the plurality of the base stations located in different frequency bands. The terminal may be connected to a first base station (e.g., a base station which provides services using the LTE technology or the 4G mobile communication technology) and a second base station (e.g., a base station which provides services using the NR technology or 5G mobile communication technology) at the same time to transmit and receive traffic. In this case, frequency resources used by each base station may be positioned in different bands. As such, the operation scheme based on the dual connectivity scheme of the LTE and the NR may be referred to as 5G non-standalone (NSA).

Figure 2A:
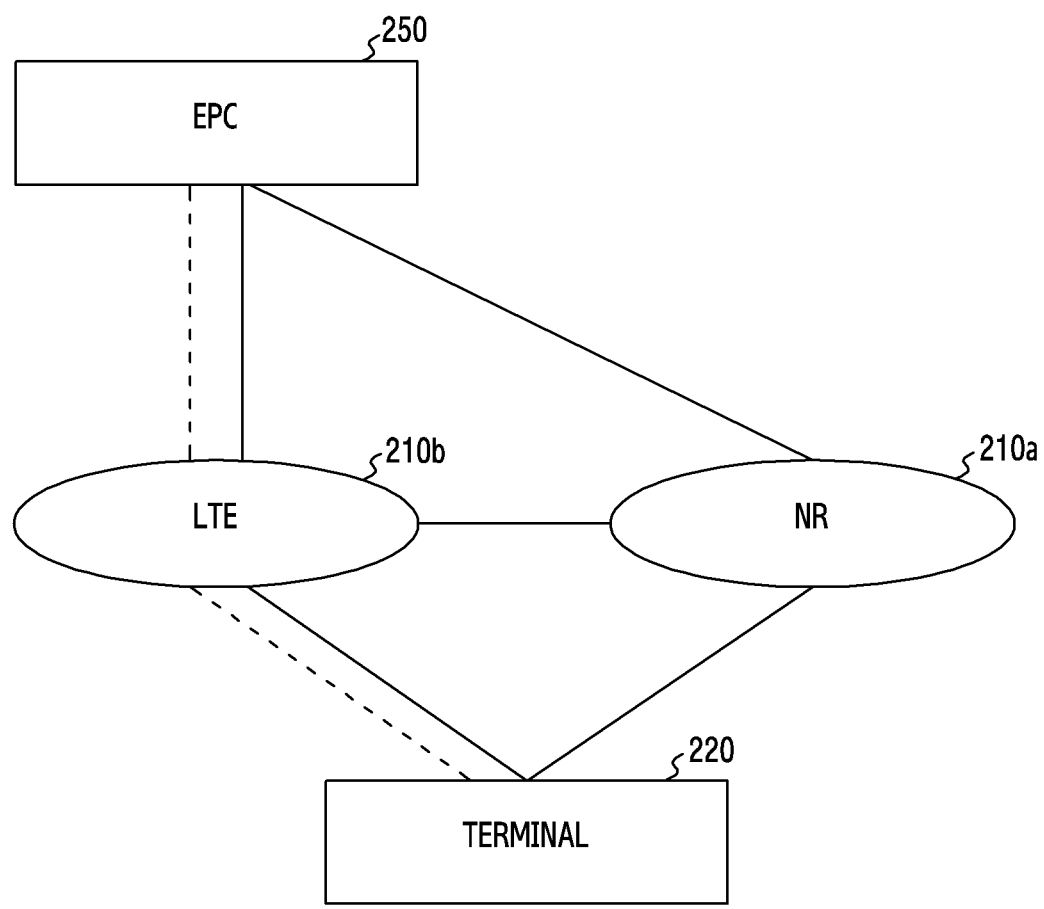
FIG. 2A illustrates an example of a 5th generation (5G) non-standard alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210a, an LTE RAN 210b, a terminal 220, and an evolved packet core network (EPC) 250. The NR RAN 210a and the LTE RAN 210b are connected to the EPC 250, and the terminal 220 may be served by any one or both of the NR RAN 210a and the LTE RAN 210b at the same time. The NR RAN 210a includes at least one NR base station, and the LTE RAN 210b includes at least one LTE base station. Herein, the NR base station may be referred to as a '5G node', a 'next generation nodeB (gNB)' or other term having the equivalent technical meaning. In addition, the NR base station may have a structure split into a CU and a DU, and the CU may also have a structure split into a CU-CP unit and a CU-UP unit.

In the structure shown in FIG. 2A, the terminal 220 may perform radio resource control (RRC) access through the first base station (e.g., the base station belonging to the LTE RAN 210b), and may be serviced with functions (e.g., connection management, mobility management, etc.) provided in the control plane. In addition, the terminal 220 may receive additional radio resources for transmitting and receiving data via the second base station (e.g., the base station belonging to the NR RAN 210a). This dual connectivity technology using the LTE and the NR may be referred to as evolved universal terrestrial radio access (E-UTRA)-NR (EN)-dual connectivity (DC). Similarly, the dual connectivity technology in which the first base station uses the NR technology and the second base station uses the LTE technology is referred to as NR-E-UTRA (NE)-DC. In addition, various embodiments may be applied to the multi connectivity and the CA technology of various types. In addition, various embodiments may be also applicable if a first system using a first communication technology and a second system using a second communication technology are implemented in one device or if the first base station and the second base station are located at the same geographic location.

Figure 2B:
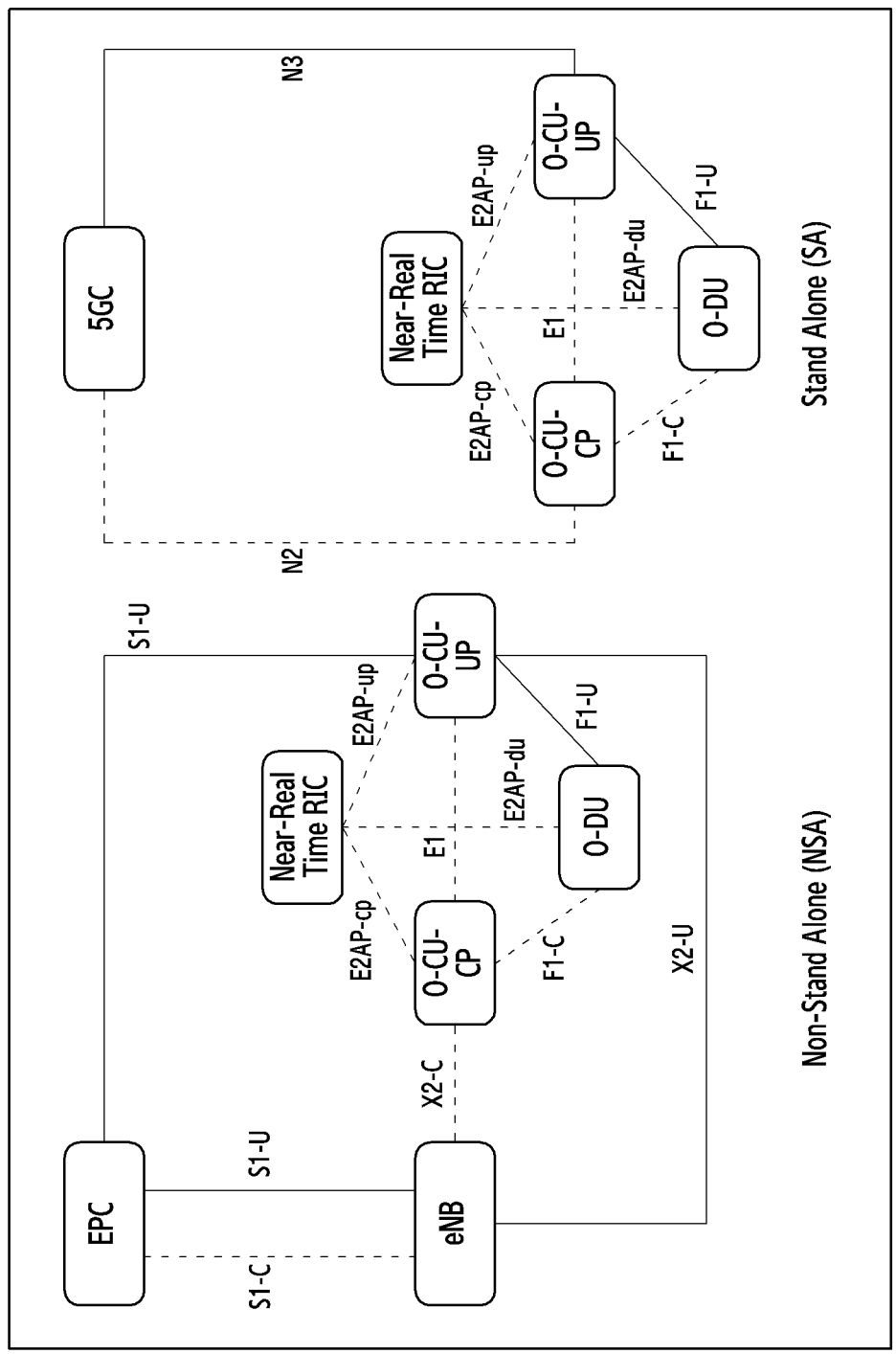
FIG. 2B illustrates an example of architecture for open radio access network (O-RAN) according to an embodiment of the disclosure.

FIG. 2B shows an architecture example for the O-RAN. For the sake of E2-SM-KPI monitoring (KPIMON) of the E2 service model, O-RAN non-stand alone in the multi-connectivity operation using the E-UTRA and the NR radio access technology is considered, whereas the E2 node may be assumed to be in an O-RAN stand alone mode according to an embodiment of the disclosure.

Referring to FIG. 2B, in deployment of the O-RAN non-stand alone mode, the eNB is connected with the EPC through an S1-C/S1-U interface, and is connected with the O-CU-CP through an X2 interface. The O-CU-CP for the deployment of the O-RAN stand alone mode may be connected with a 5G core (5GC) through an N2/N3 interface.

Figure 3:
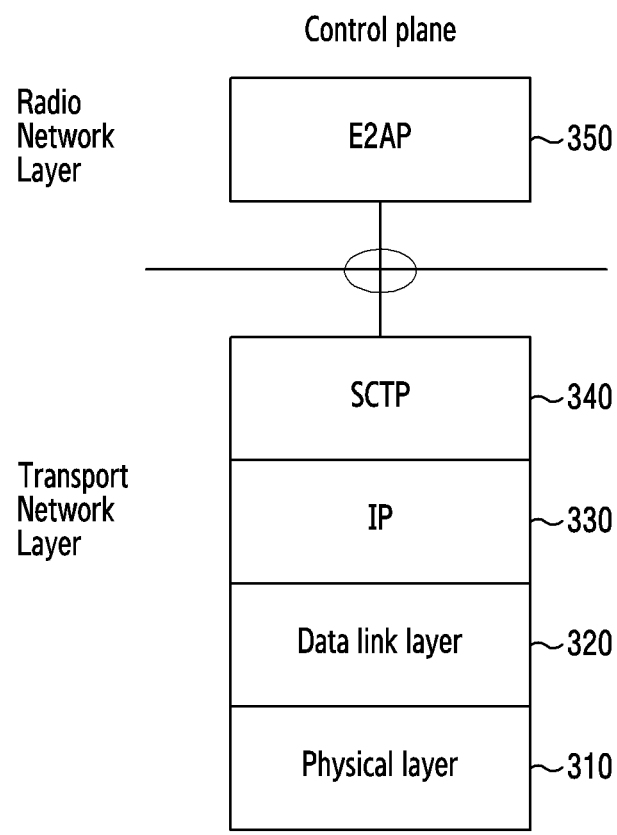
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an IP 330, and a stream control transmission protocol (SCTP) 340.

The radio network layer includes an E2AP 350. The E2AP 350 is used to deliver a subscription message, an indication message, a control message, a service update message, and a service query message, and is transmitted in a higher layer of the SCTP 340 and the IP 330.

Figure 4:
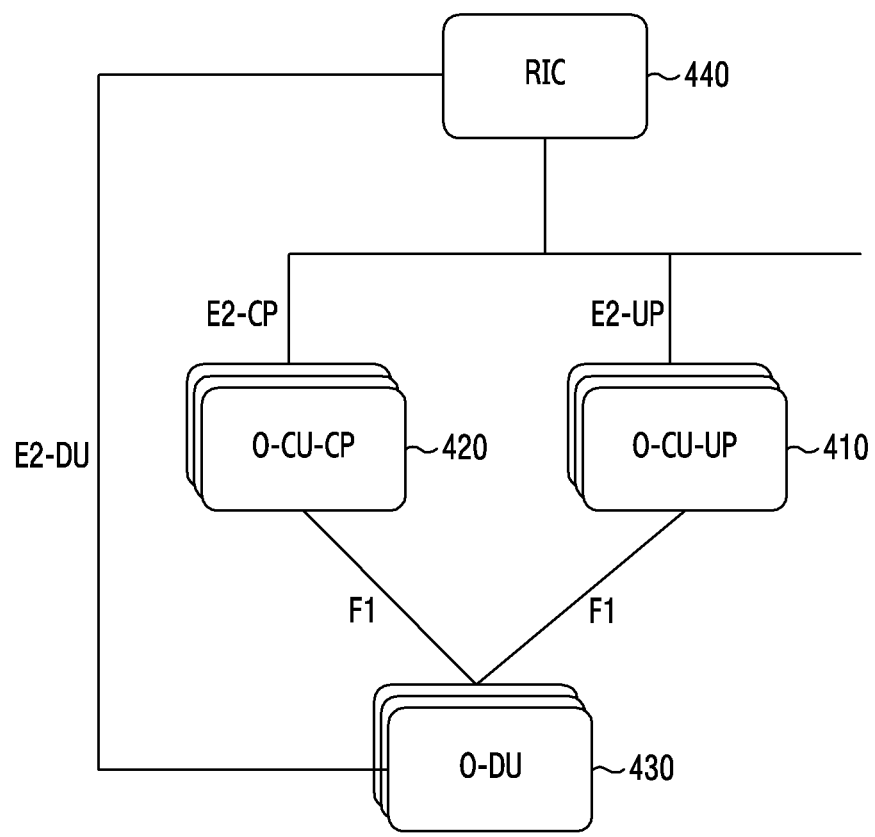
FIG. 4 illustrates an example of a connection between a base station and a RAN intelligence controller (RIC) in a radio access network according to an embodiment of the disclosure.

FIG. 4 illustrates an example of a connection between a base station and a RIC in a radio access network according to an embodiment of the disclosure.

Referring to FIG. 4, a RIC 440 is connected with an O-CU-CP 420, an O-CU-UP 410, and an O-DU 430. The RIC 440 is a device for customizing RAN functionality for a new service or reginal resource optimization. The RIC 440 may provide functions such as network intelligence (e.g., policy enforcement, handover optimization), resource assurance (e.g., radio-link management, advanced self-organized-network (SON)), resource control (e.g., load balancing, slicing policy). The RIC 440 may communicate with the O-CU-CP 420, the O-CU-UP 410, and the O-DU 430. The RIC 440 may be connected with each node through E2-CP, E2-UP, and E2-DU interfaces. In addition, the interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

While FIG. 4 illustrates one RIC 440, a plurality of RICs may exist, according to various embodiments. The plurality of the RICs may be implemented with a plurality of hardware located at the same physical location or may be implemented through virtualization using single hardware.

Figure 5:
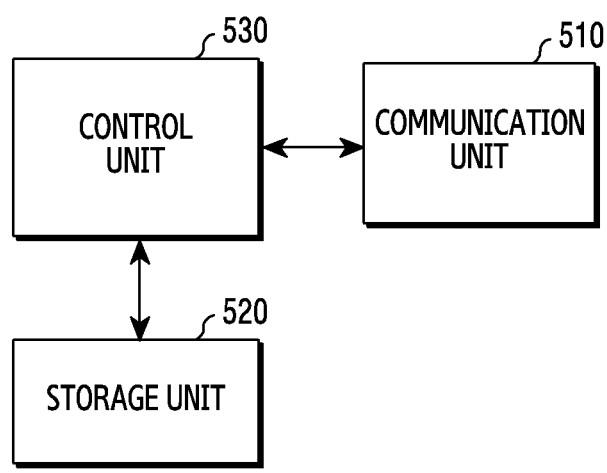
FIG. 5 illustrates a configuration of a device in a RAN according to an embodiment of the disclosure.

FIG. 5 illustrates a configuration of a device according to an embodiment of the disclosure. The structure illustrated in FIG. 5 may be understood as a configuration of a device having at least one function of the RIC, the O-CU-CP, the O-CU-UP, and the O-DU of FIG. 5. A term such as ' . . . unit' or ' . . . er' used hereafter indicates a unit for processing at least one function or operation, and may be implemented using hardware, software, or a combination of hardware and software.

Referring to FIG. 5, a core network device includes a communication unit 510, a storage unit 520, and a control unit 530.

The communication unit 510 provides an interface for communicating with other devices in the network. That is, the communication unit 510 converts a bit string transmitted from the core network device to another device into a physical signal, and converts a physical signal received from other device into a bit string. That is, the communication unit 510 may transmit and receive signals. Accordingly, the communication unit 510 may be referred to as a modem, a transmitter, a receiver, or a transceiver. In this case, the communication unit 510 enables a core network device to communicate with other devices or systems via a backhaul connection (e.g., wired backhaul or wireless backhaul) or over the network.

The storage unit 520 stores data such as a basic program, an application program, and setting information for the operations of the core network device. The storage unit 520 may include a volatile memory, a nonvolatile memory, or a combination of a volatile memory and a nonvolatile memory. The storage unit 520 provides the stored data according to a request of the control unit 530.

The control unit 530 controls general operations of the core network device. For example, the control unit 530 transmits and receives signals through the communication unit 510. In addition, the control unit 530 records and reads data in and from the storage unit 520. For doing so, the control unit 530 may include at least one processor. According to various embodiments, the control unit 530 may control the device to carry out operations according to various embodiments explained in the disclosure.

Figure 6:
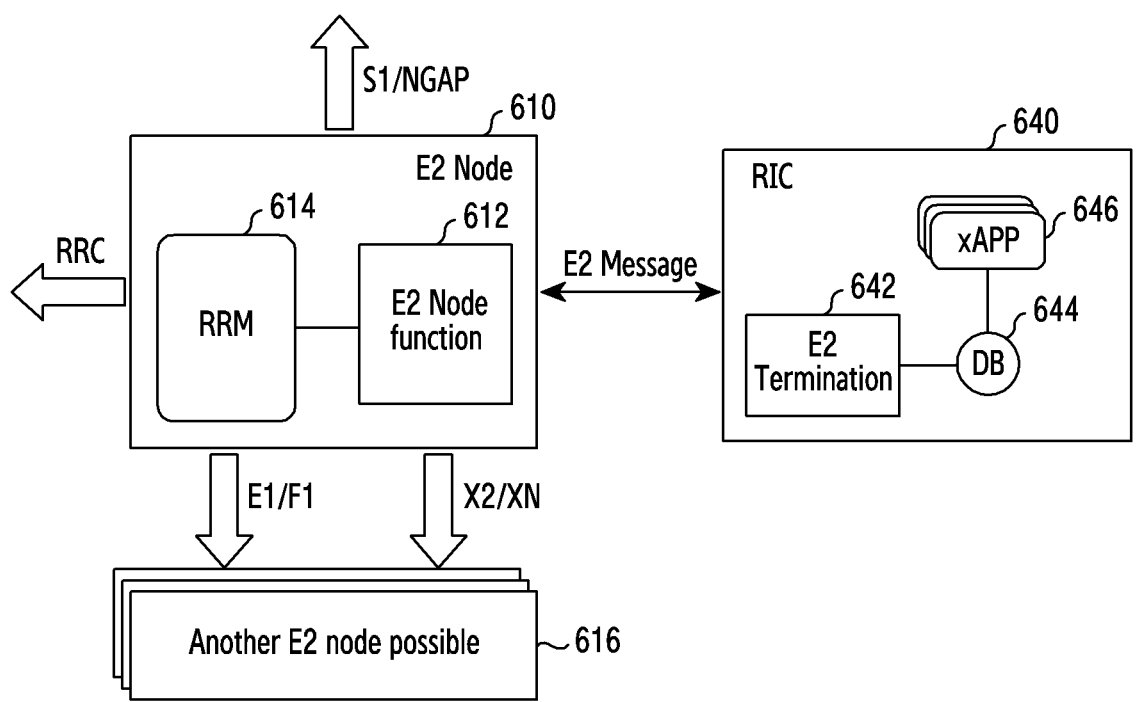
FIG. 6 illustrates logical functions related to E2 messages of an E2 node and a RIC in a RAN according to an embodiment of the disclosure.

FIG. 6 illustrates logical functions related to E2 messages of an E2 node and a RIC in a radio access network according to an embodiment of the disclosure.

Referring to FIG. 6, a RIC 640 and an E2 node 610 may transmit or receive an E2 message with each other. For example, the E2 node 610 may be an O-CU-CP, an O-CU-UP, an O-DU, or a base station. A communication interface of the E2 node may be determined according to the type of the E2 node 610. For example, the E2 node 610 may communicate with another E2 node 616 through the E1 interface or the F1 interface. Alternatively, for example, the E2 node 610 may communicate with the E2 node 616 through an X2 interface or an XN interface. Alternatively, for example, the E2 node 610 may perform communication through the S1 interface or a next generation application protocol (NGAP) interface (i.e., an interface between a next generation (NG) RAN node and an AMF).

The E2 node 610 may include an E2 node function 612. The E2 node function 612 is a function corresponding to a specific xApp (application S/W) 646 installed in the RIC 640. For example, in the KPI monitor, KPI monitor collection S/W may be installed in the RIC 640, and the E2 node 610 may include the E2 node function 612 which generates KPI parameters, and then forwards an E2 message including the KPI parameters to an E2 termination function 642 positioned at the RIC 640. The E2 node 610 may include an RRM 614. The E2 node 610 may manage resources provided to the radio network for the terminal.

The E2 termination 624 positioned in the RIC 640, which is the termination of the RIC 640 for the E2 message, may perform a function of interpreting the E2 message forwarded by the E2 node 610 and then forwarding it to the xApp 646. A database (DB) 644 positioned in the RIC 640 may be used for the E2 termination 624 or the xApp 646. The E2 node 610 shown in FIG. 6 is a termination of at least one interface, and may be understood as a termination of messages transmitted to a terminal, a neighbor base station, and a core network.

The E2 nodes transmit an E2 setup request message to the RIC for service initialization, and the RIC forwards an E2 setup response message as a response. Next, the E2 node forwards a call processing function of the RAN supported by itself to the RIC using a service update message, and the RIC forwards a service update acknowledgment (ACK) message as a response. Next, the RIC generates an E2 subscription request message, sets a call processing event by forwarding it to the E2 node (e.g., the O-CU-CP, the O-CU-UP, the O-DU), and forwards the subscription request response message forwarded by the E2 node to the RIC after setting the event.

To perform some call processing function and the RRM function, the RIC needs serving cell information and neighbor cell information at the same time as the service initiation from the E2 setting. The disclosure suggests an embodiment for delivering the serving/neighbor cell information of the E2 node, by using a message exchanged between a newly defined RIC and an E2 node (e.g., an O-DU, an O-CU-CP, an O-CU-UP).

The disclosure for solving the above problems includes, in a method of a first node of a wireless communication system, including an NR served cell list, a neighbor cell information element (IE), an E-UTRA served cell list, and a neighbor cell IE in generating an E2 setup request message at the E2 node, and generating an E2 setup response message at the RIC. In addition, the E2 setup message delivering the serving cell/neighbor cell information of the E2 node may be identified based on cell related detailed information element of the E2 setup response message transmitted from the E2 setup request message RIC transmitted from the E2 node, and information element information may include identifier information such as served cell information NR, DU ID, gNB ID, PLMN ID, and network slice ID.

Figure 7:
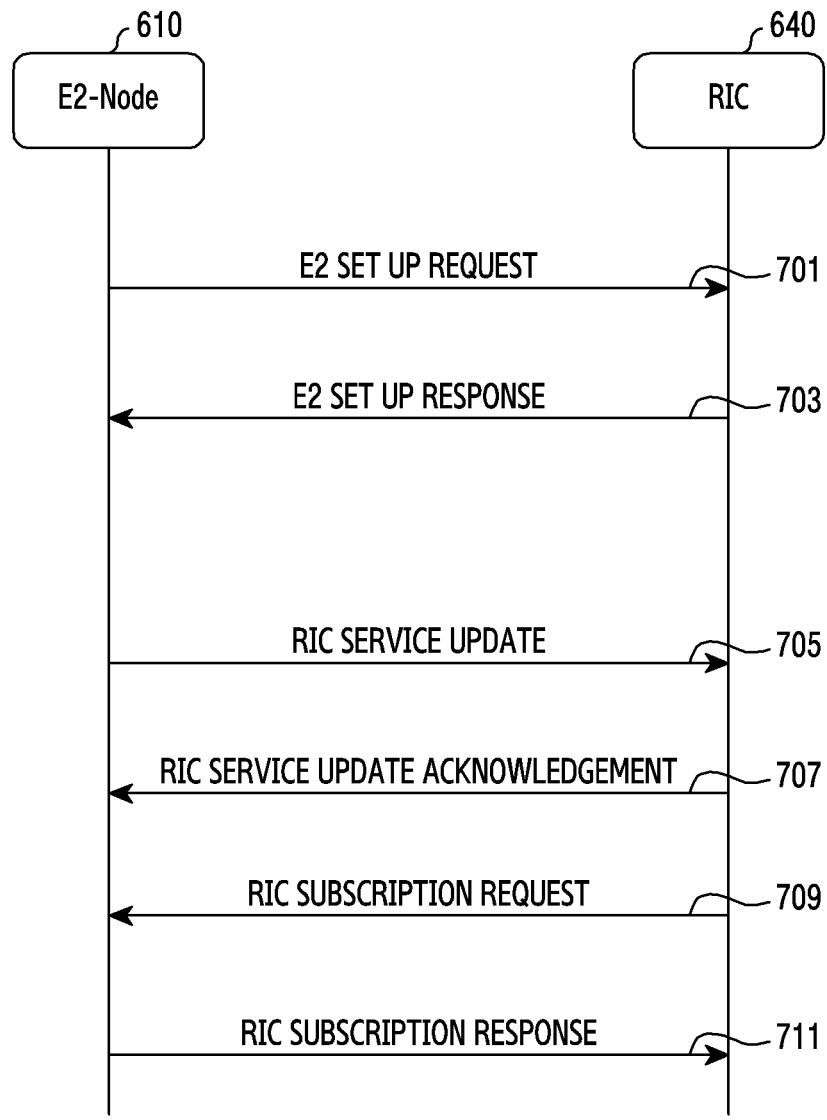
FIG. 7 illustrates a procedure for E2 I/F setup, RIC subscription, and information provision between an E2 node and a RIC in a RAN according to an embodiment of the disclosure.

FIG. 7 illustrates a procedure for E2 I/F setup, RIC subscription, and information provision between an E2 node and a RIC in a radio access network according to an embodiment of the disclosure.

Referring to FIG. 7, the E2 node 610 may transmit an E2 set up request message to the RIC 640, in operation 701. the E2 node function positioned in the E2 node 610 may find the RIC using the IP address of the RIC 640 which is set to operations-administration-management (OAM), and transmit the E2 setup request message.

In operation 703, the RIC 640 may transmit an E2 setup response message to the E2 node 610. That is, if accepting the E2 setup request message transmitted by the E2 node 610, the RIC 640 transmits the E2 setup response message.

In operation 705, the E2 node 610 transmits a RIC service update message. The E2 node 610 sets function capability supportable in the E2 node 610 to a value of E2 function ID, generates a list in RIC service update ID, and transmits an E2 service update message including them to the RIC 640.

In operation 707, the RIC 640 transmits a service updater ACK message to the E2 node 610. That is, if accepting the E2 node 610 function ID values in the E2 service o update message transmitted by the E2 node 610, the RIC 640 transmits an E2 service updater ACK message.

In operation 709, the RIC 640 transmits a RIC subscription request message to the E2 node 610. In other words, the specific xApp positioned in the RIC 640 requests the RIC E2 terminal function to subscribe for the specific E2 RAN function definition function supported by the E2.

In operation 711, the E2 node 610 may transmit a RIC subscription request message to the RIC 640. That is, the E2 node function of the E2 node 610 decodes the RIC subscription request message, and configures an event condition requested by the RIC 640 from the E2 node function. Herein, the event condition may be an operator-specifically defined service model with RAN function definition, and whether the operator is specific may be designated by a RIC style ID. After successfully configuring the event condition, the E2 node 610 may notify the RIC 640 that the event trigger condition is successfully configured by transmitting the RIC subscription response message.

In the above-described signaling procedure between the RIC and the E2 node, serving cell or neighbor cell information of the E2 node may be provided to the RIC. The serving cell or neighbor cell information of the E2 node may be delivered through one of the messages illustrated in FIG. 7, or may be delivered through a different message from the messages illustrated in FIG. 7. The corresponding message may be a message exclusively defined for delivering the serving cell or neighbor cell information of the E2 node, or may be a message defined for other purpose. For example, the serving/neighbor cell information may be delivered in the E2 setup or the E2 RAN configuration update.

Figure 8:
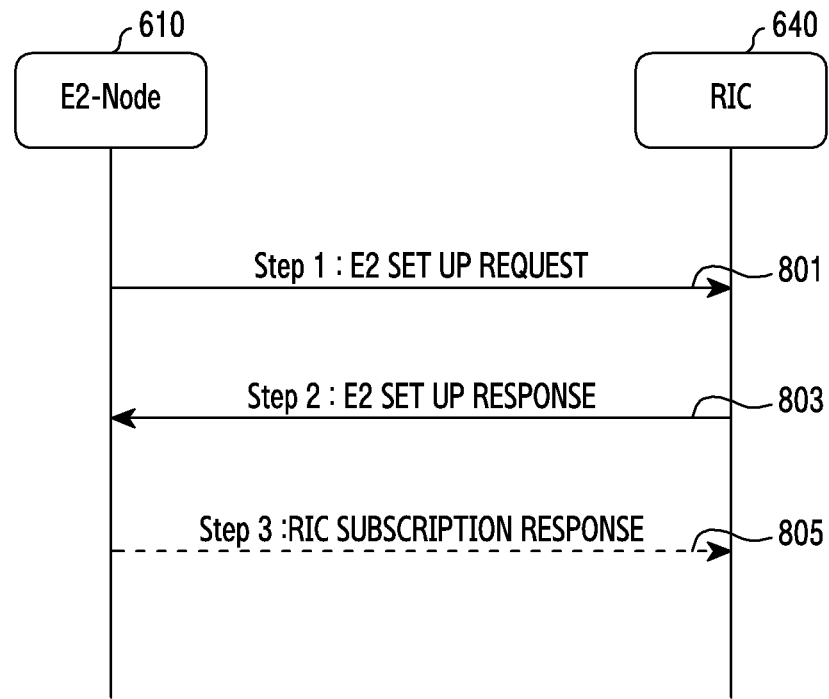
FIG. 8 illustrates a procedure for E2 interface configuration in a RAN according to an embodiment of the disclosure.

FIG. 8 illustrates a procedure for E2 interface configuration in a radio access network according to an embodiment of the disclosure.

Referring to FIG. 8, in operation 801, the E2 node 610 transmits an E2 setup request message to the RIC 640. To establish an E2 connection with the RIC 640, the E2 node 610 may identify the RIC IP address which is set to the OAM, and transmit the E2 setup request message using the identified RIC IP address. If transmitting the E2 setup request message, the E2 node 610 may transmit information of at least one serving cell or at least one neighbor cell related to the corresponding E2 node 610. According to an embodiment, the E2 node 610 may add and transmit 'List of Served Cells NR' and 'List of Served Cells E-UTRA Information Element' defined in the 3GPP standard. According to another embodiment, the E2 node 610 adds and transmits information of cells generated by a different format from the 3GPP standard. For example, details of 'List of Served Cells NR' and 'List of Served Cells E-UTRA Information Element' are described below with reference to Table 2.

In operation 803, the RIC 640 transmits an E2 setup response message to the E2 node 610. If the E2 setup request message is an intact message, the RIC E2 termination function in the RIC 640 establishes an E2 connection, stores the serving/neighbor cell information (e.g., List of Served Cells NR and List of Served Cells E-UTRA Information Element information) in a database, generates the E2 setup response message, and transmits it to the E2 node 610. Next, in operation 805, the E2 node 610 may transmit a RIC subscription response message to the RIC 640.

Figure 9:
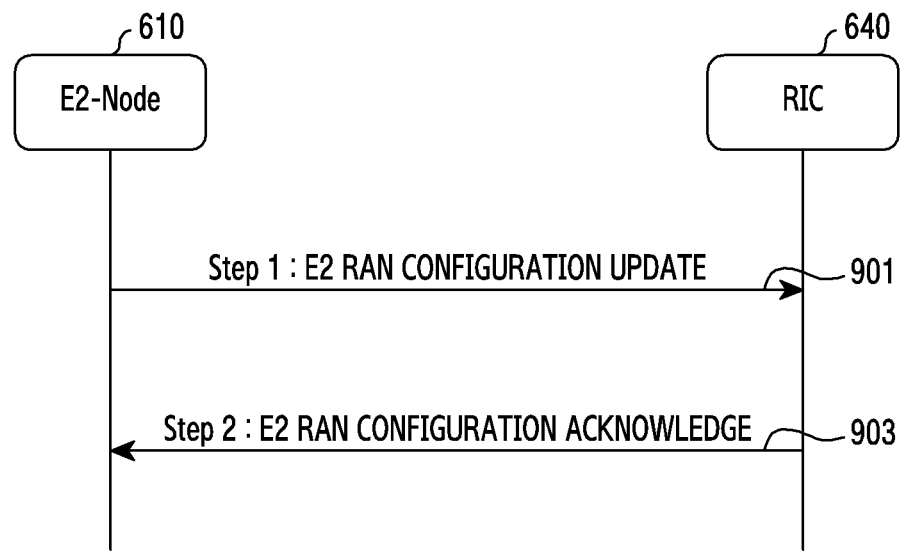
FIG. 9 illustrates a procedure for E2 RAN configuration update in a RAN according to an embodiment of the disclosure.

FIG. 9 illustrates a procedure for E2 RAN configuration update in a radio access network according to an embodiment of the disclosure.

Referring to FIG. 9, in operation 901, the E2 node 610 transmits an E2 RAN configuration update message to the RIC 640. According to an embodiment, the E2 node 610 may add and transmit 'List of Served Cells NR' and 'List of Served Cells E-UTRA Information Element' defined in the 3GPP standard into the E2 RAN configuration update message. According to another embodiment, the E2 node 610 adds and transmits information of cells generated in a different format from the 3GPP standard into the E2 RAN configuration update message. For example, details of 'List of Served Cells NR' and 'List of Served Cells E-UTRA Information Element' are described below with reference to Table 4. In operation 903, the RIC 640 transmits an E2 RAN configuration ACK message to the E2 node 610.

The following Table 1 is an example of IEs of the E2 setup message defined in the O-RAN standard.

TABLE 1

| IE/Group Name | Presence | Range | IE type and reference | Semantics description | Criticality | Assigned Criticality |
|---|---|---|---|---|---|---|
| Message Type | M | | 9.2.3 | | YES | reject |
| E2 Node ID | M | | 9.2.6 | | YES | reject |
| Functions To Add | | 0 . . . <maxofRANfunctionID> | | | YES | reject |
| >RAN Function ID | M | | 9.2.8 | Id of the declared Function | YES | reject |
| >RAN Function Definition | M | | 9.2.23 | Definition of Function | YES | reject |

In Table 1, the first IE has a unique value for each E2 message as the message type. The second IE designates the global eNB ID or global gNB ID of the E2 node as the E2 node ID. The third IE is the RAN function ID. The RAN function ID may designate a specific RAN function in a specific E2 node. The fourth IE is RAN function definition and defines the call processing function supported by the E2 node.

The following Table 2 is an example of the list of served cells NR and the list of served cells E-UTRA I IE of the E2 setup message suggested in the disclosure.

TABLE 2

| IE/Group Name | Presence | Range | IE type and reference | Semantics description | Criticality | Assigned Criticality |
|---|---|---|---|---|---|---|
| Message Type | M | | 9.2.3 | | YES | reject |
| E2 Node ID | M | | 9.2.6 | | YES | reject |
| Functions To Add | | 0 . . . <maxofRANfunctionID> | | | YES | reject |
| >RAN Function ID | M | | 9.2.8 | Id of the declared Function | YES | reject |
| >RAN Function Definition | M | | 9.2.23 | Definition of Function | YES | Reject |
| List of Served Cells NR | | 0 . . . <maxnoofCellsinNG-RAN node> | | Complete list of cells served by the O-CU-CP and O-DU | YES | reject |

TABLE 2-continued

| IE/Group Name | Presence | Range | IE type and reference | Semantics description | Criticality | Assigned Criticality |
|---|---|---|---|---|---|---|
| >Served Cell Information NR | M | | TS 36.4239.2.2.11 | | — | |
| >Neighbor Information NR | O | | TS 36.4239.2.2.13 | | — | |
| >Neighbor Information E-UTRA | O | | TS 36.4239.2.2.14 | | — | |
| List of Served Cells E-UTRA | | 0 . . . <maxnoofCellsinNG-RAN node> | | Complete list of cells served by the O-eNB. | YES | reject |
| >Served Cell Information E-UTRA | M | | TS 36.4239.2.2.12 | | — | |
| >Neighbor Information NR | O | | TS 36.4239.2.2.13 | | — | |
| >Neighbor Information E-UTRA | O | | TS 36.4239.2.2.14 | | — | |

In Table 2, the first through fourth IEs are the same as the IEs defined in the standard, and list of served cell NR and list of served cells E-UTRA IE defined in 3GPP TS 36.423 are additionally added.

The following Table 3 shows the list of served cells NR and the list of served Cells E-UTRA I IE of the E2 RAN configuration update message proposed in the disclosure.

TABLE 3

| IE/Group Name | Presence | Range | IE type and reference | Semantics description | Criticality | Assigned Criticality |
|---|---|---|---|---|---|---|
| Message Type | M | | 9.2.3 | | YES | reject |
| E2 Node ID | M | | 9.2.6 | | YES | reject |
| Functions To Add | | 0 . . . <maxofRANfunctionID> | | | YES | reject |
| >RAN Function ID | M | | 9.2.8 | Id of the declared Function | YES | reject |
| >RAN Function Definition | M | | 9.2.23 | Definition of Function | YES | Reject |
| List of Served Cells NR | | 0 . . . <maxnoofCellsinNG-RAN node> | | Complete list of cells served by the O-CU-CP and O-DU | YES | reject |
| >Served Cell Information NR | M | | TS 38.4239.2.2.11 | | — | |
| >Neighbor Information NR | O | | TS 38.4239.2.2.13 | | — | |
| >Neighbor Information E-UTRA | O | | TS 38.4239.2.2.14 | | — | |
| List of Served Cells E-UTRA | | 0 . . . <maxnoofCellsinNG-RAN node> | | Complete list of cells served by the O-eNB. | YES | reject |
| >Served Cell Information E-UTRA | M | | TS 38.4239.2.2.12 | | — | |
| >Neighbor Information NR | O | | TS 38.4239.2.2.13 | | — | |
| >Neighbor Information E-UTRA | O | | TS 38.4239.2.2.14 | | — | |

In Table 3, the first through fourth IEs are the same as the IEs defined in the standard, and the list of served cell NR and the list of served cells E-UTRA IE defined in 3GPP TS 36.423 are additionally added.

TABLE 4

| IE/Group Name | Presence | Range | IE type and reference | Semantics description | Criticality | Assigned Criticality |
|---|---|---|---|---|---|---|
| Message Type | M | | 9.2.3 | | YES | reject |
| E2 Node ID | M | | 9.2.6 | | YES | reject |
| >>Served NR Cells | | 0 ... <maxnoofCellsinNG-RANnode> | | Complete or limited list of cells served by a gNB, if requested by an NG-RAN node. | — | |
| >>>Served Cell Information NR | M | | 9.2.2.11 | | — | |
| >>>Neighbor Information NR | O | | 9.2.2.13 | NR neighbors. | — | |
| >>>Neighbor Information E-UTRA | O | | 9.2.2.14 | E-UTRA neighbors | — | |
| >>Cause | M | | 9.2.3.2 | | — | |
| Criticality Diagnostics | O | | 9.2.3.3 | | YES | ignore |

In Table 4, the first through fourth IEs are the same as the IEs defined in the standard, and the list of served cell NR and the list of served cells E-UTRA IE defined in 3GPP TS 38.423 are additionally added.

According to the above-described embodiments, the E2 configuration procedure for the E2 setup operation of the RIC and the serving cell and neighbor cell identification procedure supported by the E2 node may be performed in combination. That is, the E2 setup request message may optionally include the list of served cell NR and the list of served cells E-UTRA information element defined in 3GPP TS 36.423. According to another embodiment, the RIC may acquire the list of served cells NR and the list of served cells E-UTRA IE.

In various embodiments of the disclosure, the E2 SETUP message may perform the serving cell and neighbor cell identification procedure supported by the E2 Node in combination, and thus efficiently provide the call processing request service such as traffic steering use case, carrier aggregation use case, EN-DC use case of the RIC.

According to various embodiments, a method performed by an E2 node, the method comprising: transmitting a first message to a radio access network (RAN) intelligent controller (RIC) through an E2 interface to the RIC; and receiving a second message from the RIC in response to the first message, wherein the first message is an E2 setup request message or a configuration update message, and wherein the first message comprises at least one of first configuration information of one or more serviced new radio (NR) cells or second configuration information of one or more serviced evolved universal mobile telecommunications system (UMTS) terrestrial radio access (E-UTRA) cells.

In some embodiments, wherein the first configuration information comprises serving cell information related to NR, for each of the one or more NR cells.

In some embodiments, wherein the first configuration information further comprises at least one of neighbor cell information related to the NR or neighbor cell information related to the E-UTRA, for each of the one or more NR cells.

In some embodiments, wherein the second configuration information comprises serving cell information related to the E-UTRA, for each of the one or more E-UTRA cells.

In some embodiments, wherein the second configuration information further comprises at least one of neighbor cell information related to the E-UTRA and neighbor cell information related to the NR, for each of the one or more E-UTRA cells.

In some embodiments, wherein the first message further comprises list information for adding one or more RAN functions, wherein the list information comprises a RAN function identifier (ID) and a RAN function definition, for each of the one or more RAN functions, wherein the RIC is a near real time RIC, and wherein the E2 node comprises an open (O)-RAN distributed unit (O-DU), an O-RAN central unit-control plane (O-CU-CP), an O-RAN central unit-user plane (O-CU-UP), or an O-eNodeB (eNB).

According to various embodiments, a method performed by a radio access network (RAN) intelligent controller (RIC), the method comprising: transmitting a first message from an E2 node to the RIC through an E2 interface; and in response to the first message, transmitting a second message to the E2 node, wherein the first message is an E2 setup request message or a configuration update message, and wherein the first message comprises at least one of first configuration information of one or more serviced new radio (NR) cells or second configuration information of one or more serviced evolved universal mobile telecommunications system (UMTS) terrestrial radio access (E-UTRA) cells.

In some embodiments, wherein the first configuration information comprises serving cell information related to NR, for each of the one or more NR cells.

In some embodiments, wherein the first configuration information further comprises at least one of neighbor cell information related to the NR or neighbor cell information related to the E-UTRA, for each of the one or more NR cells.

In some embodiments, wherein the second configuration information comprises serving cell information related to the E-UTRA, for each of the one or more E-UTRA cells.

In some embodiments, wherein the second configuration information further comprises at least one of neighbor cell information related to the E-UTRA or neighbor cell information related to the NR, for each of the one or more E-UTRA cells.

In some embodiments, wherein the first message further comprises list information for adding one or more RAN functions, wherein the list information comprises a RAN function identifier (ID) and a RAN function definition, for each of the one or more RAN functions, wherein the RIC is a near real time RIC, and wherein the E2 node comprises an open (O)-RAN distributed unit (O-DU), an O-RAN central unit-control plane (O-CU-CP), an O-RAN central unit-user plane (O-CU-UP), or an O-eNodeB (eNB).

According to various embodiments, an apparatus of an E2 node, the apparatus comprising: at least one transceiver; and at least one processor, wherein the at least one processor is configured to: transmit a first message to a radio access network (RAN) intelligent controller (RIC) through an E2 interface to the RIC, and receive a second message from the RIC in response to the first message, wherein the first message is an E2 setup request message or a configuration update message, and wherein the first message comprises at least one of first configuration information of one or more serviced new radio (NR) cells or second configuration information of one or more serviced evolved universal mobile telecommunications system (UMTS) terrestrial radio access (E-UTRA) cells.

According to various embodiments, an apparatus of a radio access network (RAN) intelligent controller (RIC), the apparatus comprising: at least one transceiver; and at least one processor, wherein the at least one processor is configured to: transmit a first message from an E2 node to the RIC through an E2 interface, and in response to the first message, transmit a second message to the E2 node, wherein the first message is an E2 setup request message or a configuration update message, and wherein the first message comprises at least one of first configuration information of one or more serviced new radio (NR) cells or second configuration information of one or more serviced evolved universal mobile telecommunications system (UMTS) terrestrial radio access (E-UTRA) cells.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an E2 node, the method comprising:
    transmitting, to a radio access network (RAN) intelligent controller (RIC) through an E2 interface to the RIC, a first message; and
    receiving, from the RIC, a second message in response to the first message,
    the first message being an E2 setup request message or a configuration update message,
    wherein the first message comprises a value of message type for the first message, an identifier (ID) of the E2 node, and a list for adding one or more RAN functions,
    wherein the first message further comprises configuration information for one or more serviced cells associated with the E2 node, and
    wherein the one or more serviced cells comprise new radio (NR) cells or evolved universal mobile telecommunications system (UMTS) terrestrial radio access (E-UTRA) cells.

2. The method of claim 1, wherein the configuration information comprises serving cell information related to NR, for each of the NR cells.

3. The method of claim 2, wherein the configuration information further comprises at least one of neighbor cell information related to the NR or neighbor cell information related to E-UTRA, for each of the NR cells.

4. The method of claim 1, wherein the configuration information comprises serving cell information related to E-UTRA, for each of the E-UTRA cells.

5. The method of claim 4, wherein the configuration information further comprises at least one of neighbor cell information related to the E-UTRA or neighbor cell information related to the NR, for each of the E-UTRA cells.

6. The method of claim 1,
    wherein the list comprises a RAN function identifier (ID) and a RAN function definition, for each of the one or more RAN functions,
    wherein the RIC is a near real time RIC, and
    wherein the E2 node comprises an open (O)-RAN distributed unit (O-DU), an O-RAN central unit-control plane (O-CU-CP), an O-RAN central unit-user plane (O-CU-UP), or an O-eNodeB (eNB).

7. A method performed by a radio access network (RAN) intelligent controller (RIC), the method comprising:
    receiving, from an E2 node through an E2 interface, a first message; and
    transmitting, to the E2 node, a second message in response to the first message, the first message being an E2 setup request message or a configuration update message, wherein the first message comprises a value of message type for the first message, an identifier (ID) of the E2 node, and a list for adding one or more RAN functions, wherein the first message further comprises configuration information for one or more serviced cells associated with the E2 node, and wherein the one or more serviced cells comprise new radio (NR) cells or evolved universal mobile telecommunications system (UMTS) terrestrial radio access (E-UTRA) cells.

8. The method of claim 7, wherein the configuration information comprises serving cell information related to NR, for each of the NR cells.

9. The method of claim 8, wherein the configuration information further comprises at least one of neighbor cell information related to the NR or neighbor cell information related to E-UTRA, for each of the NR cells.

10. The method of claim 7, wherein the configuration information comprises serving cell information related to E-UTRA, for each of the E-UTRA cells.

11. The method of claim 10, wherein the configuration information further comprises at least one of neighbor cell information related to the E-UTRA or neighbor cell information related to the NR, for each of E-UTRA cells.

12. The method of claim 7,
wherein the list comprises a RAN function identifier (ID) and a RAN function definition, for each of the one or more RAN functions,
wherein the RIC is a near real time RIC, and
wherein the E2 node comprises an open (O)-RAN distributed unit (O-DU), an O-RAN central unit-control plane (O-CU-CP), an O-RAN central unit-user plane (O-CU-UP), or an O-eNodeB (eNB).

13. An E2 node, comprising:
a transceiver; and
a controller configured to:
transmit, to a radio access network (RAN) intelligent controller (RIC) through an E2 interface to the RIC, a first message, and
receive, from the RIC, a second message in response to the first message, the first message being an E2 setup request message or a configuration update message, wherein the first message comprises a value of message type for the first message, an identifier (ID) of the E2 node, and a list for adding one or more RAN functions, wherein the first message further comprises configuration information for one or more serviced cells associated with the E2 node, and wherein the one or more serviced cells comprise new radio (NR) cells or evolved universal mobile telecommunications system (UMTS) terrestrial radio access (E-UTRA) cells.

14. The E2 node of claim 13, wherein the configuration information comprises serving cell information related to NR, for each of the NR cells.

15. The E2 node of claim 14, wherein the configuration information further comprises at least one of neighbor cell information related to the NR or neighbor cell information related to E-UTRA, for each of the NR cells.

16. The E2 node of claim 13, wherein the configuration information comprises serving cell information related to E-UTRA, for each of the E-UTRA cells.

17. The E2 node of claim 16, wherein the configuration information further comprises at least one of neighbor cell information related to the E-UTRA or neighbor cell information related to the NR, for each of the E-UTRA cells.

18. The E2 node of claim 13,
wherein the list comprises a RAN function identifier (ID) and a RAN function definition, for each of the one or more RAN functions,
wherein the RIC is a near real time RIC, and
wherein the E2 node comprises an open (O)-RAN distributed unit (O-DU), an O-RAN central unit-control plane (O-CU-CP), an O-RAN central unit-user plane (O-CU-UP), or an O-eNodeB (eNB).

19. The E2 node of claim 18, wherein the near real time RIC connects to the O-CU-CP, the O-CU-UP and the O-DU with the E2 interface.

20. The E2 node of claim 18, wherein the O-CU-CP and the O-CU-UP are connected to each other using an E1 interface.

* * * * *